United States Patent Office 2,753,341
Patented July 3, 1956

2,753,341

17-PYRIDINEACRYLYL-5-ANDROSTEN-3-OLS AND THEIR ESTERS

Raymond M. Dodson, Park Ridge, Ill., assignor, by mesne assignments, to G. D. Searle & Co., Skokie, Ill., a corporation of Delaware No Drawing. Application December 2, 1954, Serial No. 472,775

6 Claims. (Cl. 260—239.5)

The present invention relates to a new group of heterocyclic derivatives of steroids and, more specifically, to 17-(pyridineacrylyl)-5-androsten-3-ols and their esters.

The compounds of this invention can be represented by the general structural formula

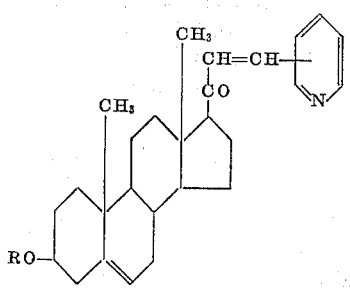

wherein R is a hydrogen atom or a (lower hydrocarbon)-carbonyl radical containing preferably no more than 8 carbon atoms such as a formyl, acetyl, propyionyl, butyryl, valeryl, caproyl, benzoyl, toluyl, cyclohexanecarbonyl, cyclohexaneacetyl or cyclopentanepropionyl radical.

The compounds of this invention are of value because of their hormonal effect and particularly their antihypertensive action. They are also of value as intermediates in the organic synthesis of other hormonally active agents. Thus, Oppenauer oxidation of compounds of the foregoing structural formula, wherein R is a hydrogen atom, yields the corresponding 4-pregnen-3-one derivatives which are likewise hypotensive agents and also have a luteoid hormonal action. Other valuable cardiac and vasodilator agents are obtained by reduction of the claimed compositions with sodium borohydride whereby the oxo group in the 20-position is converted to a hydroxy group.

The pyridine derivatives of this invention form salts with inorganic and strong organic acids including hydrochloric, hydrobromic, hydriodic, sulfuric, phosphoric, sulfamic, acetic, propionic, butyric, benzoic, cinnamic, citric, lactic, ascorbic, gluconic, and related acids.

The compounds which constitute this invention and the methods for this preparation will appear more fully from the consideration of the following examples. However, these are not to be contrued as limiting the invention in spirit or in scope. Quantities of materials are indicated in parts by weight and temperatures in degrees centigrade.

Example 1

In 100 parts of methanol there are dissolved first 2.3 parts of sodium, then, with heating, 6.32 parts of 3-hydroxy-5-pregnen-20-one and finally, 4.28 parts of the hydrate of isonicotinaldehyde. The reaction mixture is permitted to stand at room tmeperature for a week after which the precipitate is collected on a filter, and washed with cold methanol. The product thus obtained is recrystallized from acetone to yield a 17-(4-pyridineacrylyl)-5-androsten-3-ol which melts at about 229.5–231.5° C. The compound has the structural formula

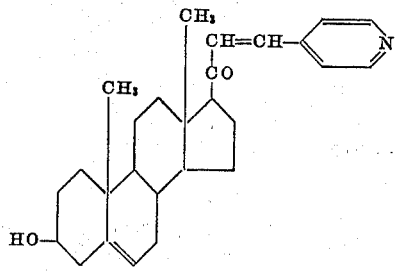

Example 2

To a solution of 2.3 parts of sodium in 100 parts of methanol, there are added 6.32 parts of 3-hydroxy-5-pregnen-20-one and then 4.28 parts of nicotinaldehyde. After standing at room temperature for 15 hours the mixture is filtered and the material collected on the filter is washed with methanol. On crystallization from ethanol, the 17-(3-pyridineacryly)-5-androsten-3-ol thus obtained melts at about 193–195° C. It has the structural formula

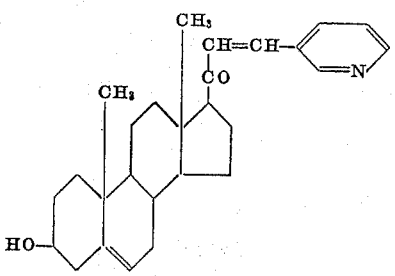

Example 3

In a solution of 23 parts of sodium in 1000 parts of methanol there are dissolved first 63.2 parts of 3-hydroxy-5-pregnen-20-one and then 42.8 parts of picolinaldehyde. After standing at room temperature for 3 days the precipitate is collected on a filter and crystallized from acetone and ethanol, the mother liquor being saved. The crystals on further recrystallization from ethanol melt at about 214–215.5° C. The 17-(2-pyridineacrylyl)-5-androsten-3-ol has the structural formula

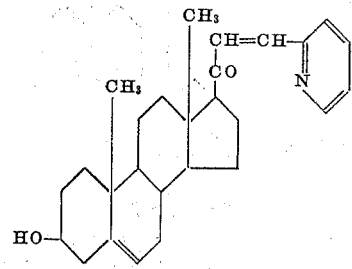

Evaporation of the above-mentioned mother liquor and repeated crystallization of the residue from acetone and petroleum ether and then from methanol yields an isomer melting at about 158–159° C. which is apparently solvated.

Example 4

A mixture of 52 parts of 17-(4-pyridineacrylyl)-5-androsten-3-ol, 2000 parts of pyridine and 2200 parts of acetic anhydride is permitted to stand at room temperature for 2 hours after being warmed briefly to effect solution. The mixture is then diluted with ice water and the precipitate is crystallized from a mixture of acetone and petroleum ether. The 3-acetoxy-17-(pyridineacrylyl)-5-androstene thus obtained melts at about 162–168° C. On recrystallization from ethanol the compound melts at 164–166.5° C. It has the structural formula

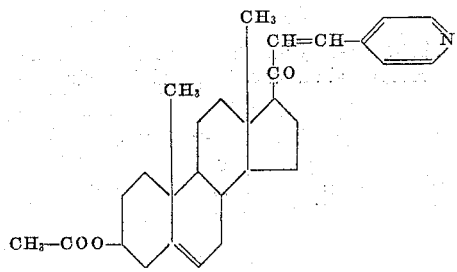

*Example 5*

To a solution of 2 parts of 17-(3-pyridineacrylyl)-5-androsten-3-ol in a minimum of pyridine are added 4 parts of benzoyl chloride and the mixture is maintained at 25° C. for 12 hours. The mixture is then diluted with ether, washed successively with water, 5% aqueous sodium hydroxide and again with water, dried over anhydrous calcium sulfate, filtered and evaporated. The residue is washed with benzene. There is thus obtained 3-benzoyloxy-17-(3-pyridineacrylyl)-5-androstene which shows infrared maxima at 5.79, 5.93, 6.06, 6.22, 6.29 and 6.48 microns. It has the structural formula

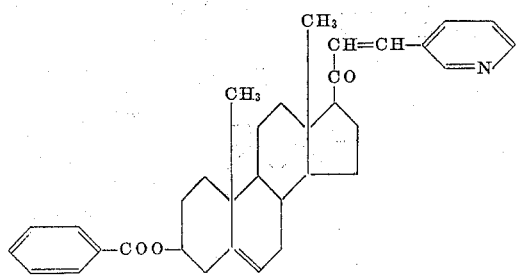

*Example 6*

Reaction of 4.5 parts of β-cyclopentanepropionyl chloride and 2 parts of 17-(3-pyridineacrylyl)-5-androsten-3-ol in pyridine by the method of the preceding example yield the 3 - (β - cyclopentanepropionyloxy)-17-(3-pyridineacrylyl)-5-androstene which shows infrared maxima at 5.78, 5.93, 6.06, 6.22, 6.29, and 6.48 microns. It has the structural formula

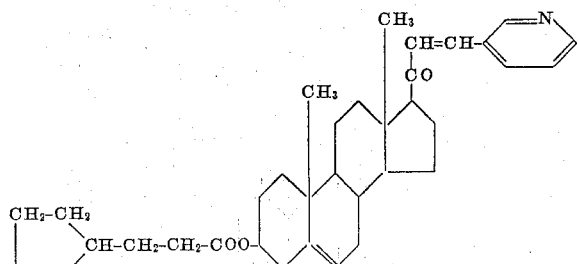

*Example 7*

To a solution of 5 parts of 17-(4-pyridineacrylyl)-5-androsten-3-ol in 100 parts of dioxane and 80 parts of ethanol there is added at room temperature a solution of 5 parts of sodium borohydride in 80 parts of methanol and 80 parts of ethanol. After standing at room temperature for 15 minutes the mixture is cooled and the excess of sodium borohydride is decomposed by cautious addition of acetic acid. The reaction mixture is diluted with water and rendered alkaline by addition of ammonia. This precipitate is collected on a filter and taken up in acetone. The resulting acetone solution is filtered, concentrated to a small volume and cooled and the resulting precipitate is crystallized successively from dilute methanol and acetone. There is thus obtained a 21-isonicotinylidene-5-pregnene-3,20-diol melting at about 261–264° C.

*Example 8*

To an anhydrous mixture of 2 parts of 17-(3-pyridineacrylyl)-5-androsten-3-ol in 30 parts of toluene and 20 parts of cyclohexanone are added 2.5 parts of aluminum isopropoxide in 10 parts of toluene. The mixture is heated at reflux for 20 minutes, poured into 100 parts of a saturated aqueous Rochelle salt solution and then steam distilled to remove the organic solvents. The solid residue is collected on a filter and crystallized successively first from dilute methanol, then from acetone and petroleum ether, and then again from methanol to yield 17-(3-pyridineacrylyl)-4-androsten-3-one melting at about 253–255° C.

*Example 9*

To a solution of one part of 17-(2-pyridineacrylyl)-5-androsten-3-ol in 15 parts of toluene and 10 parts of cyclohexanone are added 1.25 parts of aluminum isopropoxide in 5 parts of toluene. After heating under reflux for 20 minutes, the mixture is poured into 100 parts of saturated Rochelle salt solution. The organic solvents are removed by steam distillation and the solid residue is collected on a filter. Upon repeated recrystallization from methanol the 17-(2-pyridineacrylyl)-4-androsten-3-one thus obtained melts at about 232–234° C.

What is claimed is:

1. A compound of the structural formula wherein R is a member of the class consisting of hydrogen and acyl radicals derived from hydrocarbon carboxylic acids containing no more than 8 carbon atoms.
2. 17-(4-pyridineacrylyl)-5-androsten-3-ol.
3. 17-(3-pyridineacrylyl)-5-androsten-3-ol.
4. 17-(2-pyridineacrylyl)-5-androsten-3-ol.
5. 3 - (lower alkanoyloxy) - 17 - (pyridineacrylyl) - 5-androstene.
6. 3-acetoxy-17-(pyridineacrylyl)-5-androstene.

No references cited.